United States Patent [19]

Jay

[11] 4,209,123
[45] Jun. 24, 1980

[54] PREVENTION OF SENSITIZATION OF WELDED-HEAT AFFECTED ZONES IN STRUCTURES PRIMARILY MADE FROM AUSTENITIC STAINLESS STEEL

[76] Inventor: Matthew C. Jay, 8411 Neva Ave., San Diego, Calif. 92123

[21] Appl. No.: 32,272

[22] Filed: Apr. 23, 1979

Related U.S. Application Data

[63] Continuation of Ser. No. 927,588, Jul. 24, 1978, abandoned.

[51] Int. Cl.$^2$ .............................................. B23K 9/00
[52] U.S. Cl. .................................. 228/175; 228/189; 228/222; 285/286; 403/272; 428/683
[58] Field of Search ............... 228/175, 187, 189, 222; 219/59, 61; 285/286; 403/271, 272; 428/683

[56] References Cited

U.S. PATENT DOCUMENTS

| | | | |
|---|---|---|---|
| 2,308,307 | 1/1943 | Robinson | 285/286 X |
| 2,396,704 | 3/1946 | Kerr | 285/286 X |
| 2,555,256 | 5/1951 | Tyson | 285/286 |
| 2,787,699 | 4/1957 | Jessen | 285/286 X |
| 3,467,410 | 9/1969 | Chandler | 285/286 X |
| 4,049,186 | 9/1977 | Hanneman et al. | 228/225 |

*Primary Examiner*—Lowell A. Larson
*Assistant Examiner*—K. J. Ramsey
*Attorney, Agent, or Firm*—Donald D. Mon

[57] ABSTRACT

A process for joining together parent parts made from wrought austenitic stainless steel without sensitization of the parent material, and the product produced by this process. Each wrought workpiece has welded thereto an appendage made from cast (not wrought) austenitic stainless steel which is equal to or better in corrosion resistance and mechanical properties, and is compatible with the solution heat treatment requirements of the parent austenitic stainless steels. The resulting workpiece is solution heat treated at in-process stages of manufacture to dissolve the carbides which have been formed in the heat affected zone created by the welding operation. Then two of said workpieces are welded together at the abutment of the appendages, there being no formation of precipitated carbides in the parent material, because the heat affected zone does not extend into the wrought parent material, but instead is restricted to the appendage which by definition is not sensitizable.

15 Claims, 10 Drawing Figures

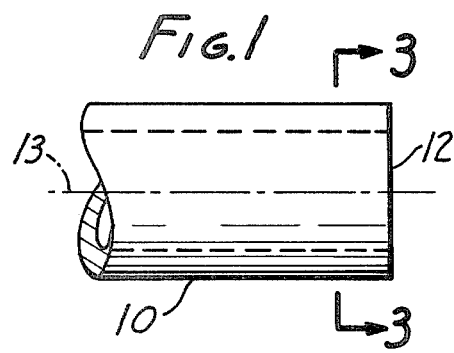
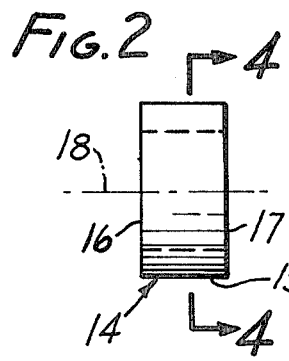
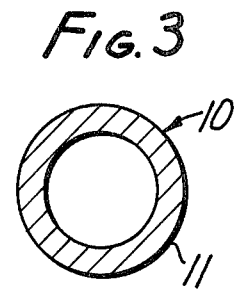
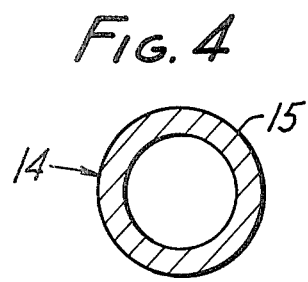
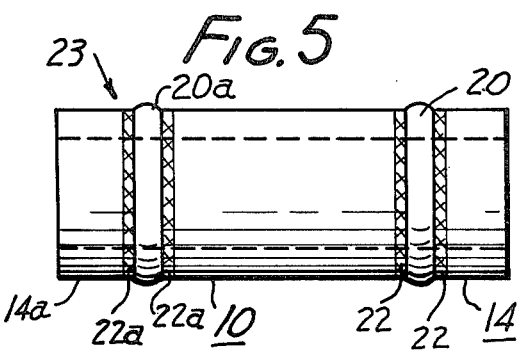
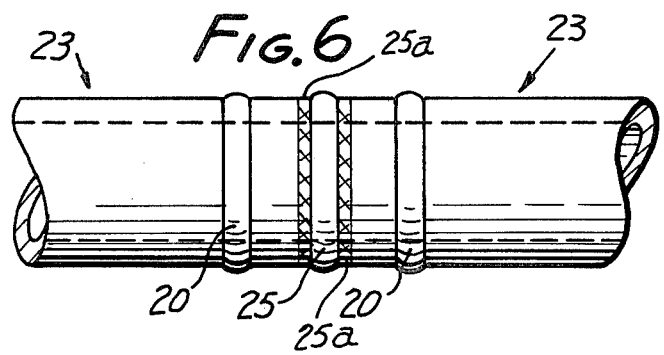
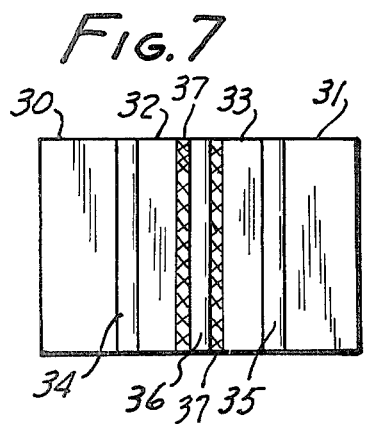
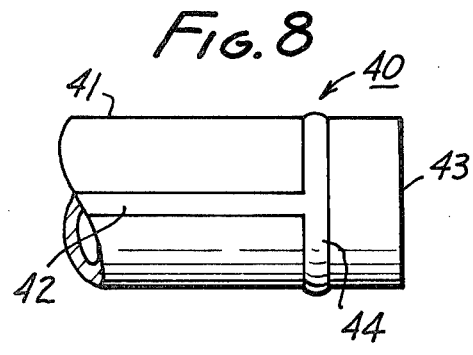

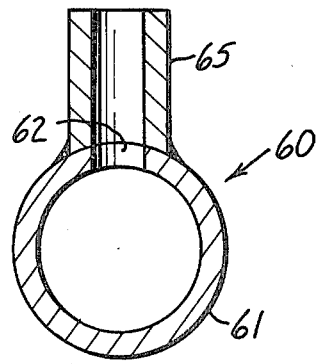
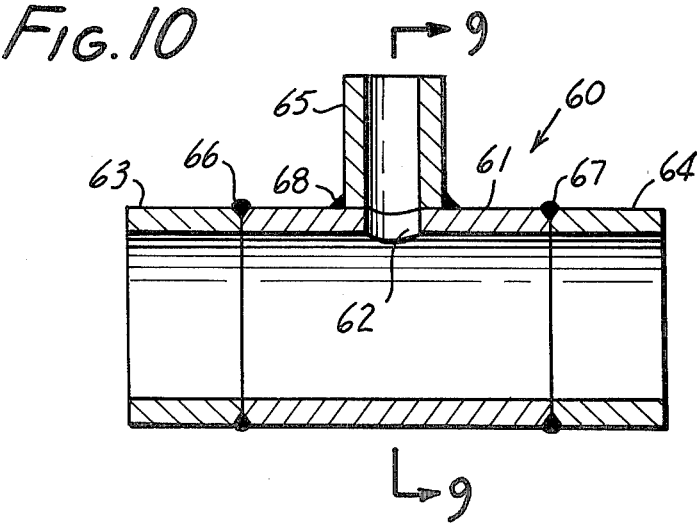

PREVENTION OF SENSITIZATION OF WELDED-HEAT AFFECTED ZONES IN STRUCTURES PRIMARILY MADE FROM AUSTENITIC STAINLESS STEEL

This is a continuation of application Ser. No. 927,588, filed on July 24, 1978, now abandoned.

This invention relates to the assembly by welding of parent parts made from wrought austenitic stainless steels. Such wrought steels are prone to sensitization as the consequence of being heated to sufficient temperatures during welding operations. Such sensitization can have unfortunate consequences.

Wrought austenitic stainless steels are very useful in industry. They have favorable mechanical and corrosion resistance properties, and are comparatively inexpensive. However, when workpieces which are made from these materials are directly welded together, a zone on each side of the weld is heated to sensitizing temperatures so that, when the weld is finalized, carbides are precipitated into the grain boundaries in that zone. That zone is called the "heat affected zone" (HAZ), and the precipitated chromium carbides in the grain boundaries are referred to as "sensitization".

Persons skilled in the metallurgy and welding art are aware of sensitization and of its undesirability, and careful welding techniques are required to weld wrought austenitic stainless steels to minimize, not to prevent, sensitization. However, such procedures employ costly interpass temperatures and other essential techniques which require nearly laboratory-quality controls which are rarely achieved in the field or shop where a welder working under something less than impossible 100% inspection surveillance or under less than optimum working conditions attempts to make the weld. Whatever may be the ultimate potential and ideal weld, in practice in a long pipeline or in a complicated pipe maze, few if any of such welds can be relied on for total absence of sensitization.

In fact, it is well-known that in nuclear reactors of the boiling water type (BWR), and also in other types of reactors, and in refineries and in various chemical industries, their water, steam, and by-pass line pipes, which are most advantageously made from type 304 stainless steel, suffer heavily from cracks and leaks in the weld areas. These systems are shut down for repair for very substantial periods of time. The loss to society and the utilities of the energy or manufactured products which would or could have been developed is large, as is the cost of oil or other fuels to replace energy which is not developed. Also, fixed capital costs continue to run whether the reactor or other system does or not.

Leaks at welded joints can be avoided, not only by enforcing impossible standards, but also by utilizing undesirably expensive materials. For example, cast structured austenitic stainless steel pipe (not wrought) will not sensitize. However, the cost is far too high, and in the majority of the usages the pipe wall thicknesses are too thin to lend themselves to be manufactured by the casting process. Also, use of costly extra-low-carbon grades of austenitic stainless steel are employed to minimize sensitization, but at a loss of design allowables. Use of costly titanium-stabilized (type 321) alloys suffer large losses of the titanium during arc transfer, and columbium-stabilized grades (type 347) tend to develop cracks at welding stages. With the use of this invention it is unnecessary to resort to the more expensive materials, because ordinary wrought welded-seam pipe in its finalized solution heat-treated condition is every bit as useful as any of the higher cost materials.

There are various theories on why wrought austenitic stainless steel structures crack and leak in sensitized heat affected zones. While these are interesting, this invention can be utilized without an in-depth endeavor into the applicable metallurgy involved, and this theoretical discussion is not a limitation on the invention. Factually and in part, the formation of chromium carbides and their precipitation into the grain boundaries of the wrought heat affected zone (HAZ) deplete the chromium from the parent metal and reduce the corrosion resistance thereof. An unsensitized HAZ will not cause cracks while a sensitized one will, after prolonged contact with the transmission of hot water, steam, and gases.

The problem therefore arises as to how to join together parent parts of economically-affordable wrought austenitic stainless steel using welding processes so as to produce a non-sensitized, useful as-welded structure of ultimate structural integrity, safety and durability. It is well to remember at this point that welded austenitic pipe is solution heat-treated at in-process stages of manufacture after its longitudinal seam has been welded, to remove the sensitization caused by the welding of the seam. However, whether the finished pipes are wrought seam-welded or wrought seamless, when two such pipes are welded together, then sensitization is likely to occur in the HAZ at the butt weld. The problem there is that the butt weld is not amenable to solution heat treatment, because it is by then assembled into a pipe line or a pipe matrix. In other words, if the weld inherently involves the risk of sensitization, it also inherently involves the risk of future leakage. Clearly the basic idea of directly welding together two wrought austenitic stainless steel structures when sensitization of the HAZ is ultimately hazardous, is basically faulty. It is equally faulty to cause an entire structure to be made from unnecessarily expensive material solely to solve a local problem.

However simplistic such statements may seem, the facts are that structures prone to leakage continue to be made, and that their repairs tend to constitute the substitution of uneconomical materials in response to the leaks as they develop. Clearly a new approach is called for, such as a new standard for high integrity stainless-steel piping systems as offered by this invention.

It is an object of this invention to provide process and product wherein non-sensitized workpieces primarily made from parent parts of wrought austenitic stainless steel can be joined by welding without sensitization at or adjacent to the heat affected zone of the final weld, in the as-welded condition. By "as-welded condition" is meant the condition of the assembled structure after the weld has been finalized, and without subsequent heat-treatment. The workpieces can therefore be welded in place, and such weld and its HAZ are not sensitized.

By way of further explanation, it is stated that there will be an HAZ wherever the parent material is heated by the welding arc or flame directly or by conduction. Wrought austenitic stainless steel becomes sensitized because of the effect of the precipitation of chromium carbides into the grain boundaries. "Wrought" structure, by definition, is crystalline with grain boundaries. A cast austenitic structure, on the other hand, which is dendritic has non-connected pools of ferrites. It follows that the cast (dendritic) material can be welded without sensitizing the HAZ, because the carbides that are formed cannot adversely affect grain structure and grain boundaries.

This invention is carried out with workpieces each comprising a parent part principally made from wrought austenitic stainless steel, to which appendages made of a compatible material not subject to sensitization in the HAZ have been welded to each extremity. No care needs to be taken to avoid sensitization in making the workpiece, because after the appendages are welded on to the parent part, the workpiece is solution heat-treated at in-process stages of manufacture to remove the sensitization. Thereafter, two workpieces are assembled together by welding at the appendages, care being taken to provide an appendage of suitable dimensions so that the HAZ does not extend into the parent part.

According to a preferred but optional feature of this invention, the parent part is made from type 304 wrought austenitic stainless steel, and the appendage is made from cast austenitic stainless steel, preferably type 308 or its casting alloy equivalent. The weld filler metal is preferably type 308 stainless steel.

According to still another preferred but optional feature of this invention, the parent part is a pipe, preferably welded seam pipe, and the appendages are tubes.

The above and other features of this invention will be fully understood from the following detailed description and the accompanying drawings in which:

FIG. 1 is a side elevation of a parent part useful in the present invention;

FIG. 2 is a side elevation of an appendage for use with the parent part of FIG. 1;

FIGS. 3 and 4 are cross-sections taken at lines 3—3 and 4—4 of FIGS. 1 and 2, respectively;

FIG. 5 shows a workpiece according to the invention;

FIG. 6 is a side view of an assembly of two workpieces welded together according to the invention;

FIG. 7 shows another embodiment of assembled article according to the invention;

FIG. 8 shows one end of the presently preferred type of workpieces for use in a piping installation;

FIG. 9 is a cross-section taken at line 9—9 in FIG. 10; and

FIG. 10 shows a coupling manufactured according to this invention, for use as a workpiece.

In FIG. 1 there is shown a parent part 10 comprising a length of pipe. The pipe has a peripheral wall 11 and an end 12 which has been cut off normal to the central axis 13 of the pipe. The parent part is made of wrought austenitic stainless steel which will be described in detail below. It is of the type which tends to form carbides when heated to a sufficient temperature for a sufficient period of time. The zone where this will occur is called the "heat affected zone" (HAZ), and because the wrought material has grains and grain boundaries, the carbides will be precipitated in the grain boundaries to form "sensitization". The carbides concentration is a function of the temperature attained and of the length of time the parent part is kept at that temperature. The higher the temperature and the longer the time at the temperature, the greater the carbide concentration will be.

An appendage 14, is shown in FIG. 2. Two are used for each workpiece(14 and 14a in FIG. 5). These are identical, so that only appendage 14 will be described in detail. It has a wall 15 and a pair of ends 16, 17 which are cut normal to the central axis 18. It is made of a cast material which will be described in greater detail below. This material does not become sensitized in its HAZ.

FIG. 5 shows appendages 14 and 14a welded to parent part 10 at welds 20, 20a. The welding process heats the parent part adjacent to its end, and thereby creates weld heat affected zones (HAZ) 22, 22a. The HAZS are schematically shown by cross-hatching. It is a simple matter to solution heat-treat this material to eliminate the carbides from the HAZ, thereby desensitizing it. As a consequence one obtains a workpiece 23 as shown in FIG. 5, but without sensitivity. It comprises a length of parent material, and a pair of appendages. The appendages are amenable to welding without sensitization in their heat affected zones.

Now to make an assembled article, a pair of workpieces 23 are welded together as shown in FIG. 6 by means of a weld 25. This weld can be made in accordance with any suitable welding process. The longitudinal (axial) length of the appendages is of such dimension of length as to protect the parent material from reaching a temperature where carbides will be formed. That is to say, the HAZ does not enter or invade the parent part. The HAZ 25a (schematically shown by cross-hatching) is therefore restricted to the appendage where sensitizing does not occur, and no harm will be done Therefore a welded joint can be formed in the field or shop without sensitization (carbide precipitation into grain boundaries of the wrought parent material).

FIG. 7 shows that, while piping is a primary field of use for this invention, plates and other structures can also be assembled with it. For example, parent parts 30 and 31 in FIG. 7 are both flat plates, as are their appendages 32, 33. Of course other appendages can or will be similarly provided on other edges of the plates where welds are also to be made. Welds 34, 35 were first made to create the workpieces, and the workpieces thereafter were solution heat treated to dissolve the carbides. Then the final weld 36 between the appendages can be made in the shop or field. The resulting HAZs 37 are schematically shown by cross-hatching. The structure is sound in its as-welded condition.

FIG. 8 shows one end of a workpiece 40 comprising a parent part 41 which is welded pipe having an axial seam 42. Appendage 43 is welded to the parent part by weld 44. A similar appendage (not shown) will be welded to the other end of the pipe. The entire workpiece is solution heat treated to dissolve the carbides. Because welded pipe is routinely solution heat treated, this procedure does not require any additional heat treatment to make the workpiece. The heat treatment of the seam is merely deferred until after the appendage has been welded on. The materials of construction are the same as for the other embodiments, and as yet to be described. Welded pipe has the same strength as seamless pipe, and is much cheaper. This invention thereby can secure for the builder all of the advantages of the more expensive wrought seamless or cast seamless pipe, but at a very much lower cost.

Instead of forming workpieces from flat plates and from pipes and tubes, it is possible to use this invention to form different and more complicated structures. For example, flat plates could instead be bent to form tanks and cylinders. Or other classes of joints can be assembled, for example a coupler 60 as shown in FIGS. 9 and 10.

Coupler 60 comprises a parent part 61 which is tubular and which has a side port 62 drilled through its walls. It has three, rather than two, appendages 63, 64, 65. Appendages 63 and 64 are joined to the parent part by welds 66, 67. Appendage 65 is joined to the wall of the parent part, around the side port, by weld 68. The parent part is made of the same type of material as the parent parts already described. The appendages are made of the same material as the appendages already described.

Coupler 60 comprises a workpiece which, after welds 63, 64 and 65 are completed (forming three HAZs), is solution heat treated to remove sensitization. Then this workpiece is weldable to other structure as already described. It illustrates the wide variety of structures and shapes which can be made with this invention. The invention is not limited to pipes or conduits.

FIGS. 9 and 10 show that an appendage can be mounted to a "face" of the parent part, in this case the outer wall of the pipe. It could, of course, be applied to one side of a plate instead of to the wall of a pipe.

The materials for the parent part are weldable wrought austenitic stainless steel. In the trade these are generally known as the 300 series, whose weldable members are 301, 302, 304, 308, 309, 310, 312, 314, 316, and 317. The most important member of this series for this invention because of its strength, cost, and corrosion resistance, is type 304.

It is a matter of considerable importance that one need not resort to the use of costly extra low carbon or stabilized grades of steels in an effort to reduce carbide formation. After the workpiece has been heat treated, carbide formation does not occur in the parent part, and is a matter of indifference in the appendage.

For the appendage, one can use any suitable cast dendritic structured austenitic stainless steel alloy, or any other non-sensitizing alloy of wrought or cast structure which is equal to or better in corrosion resistance and mechanical properties of, and is compatible with the solution heat treatment requirements of, the parent wrought austenitic stainless steel.

The appendages may include any of the 300 series grade of stainless steels which is appropriate to the said parameters of a given weld, with the exception of type 303 (which is free machining and not regarded as suitable for welding), and of types 321 and 347 stabilized grades. Also, nickel-based alloys and austeno-ferritic alloys.

The preferred combination of materials is type 304 in the wrought condition for the parent part, type 308 (or its casting alloy equivalent) in the cast condition for the appendage. Type 308 material, is used for the weld filler metal also.

This invention permits designers to utilize the inexpensive type 304 stainless in installations where before it has been necessary to go to more expensive alternatives to avoid the leaking of the weld assemblies. Furthermore, because this utilizes convenient and relatively uniform stainless steel alloys throughout, it can be used at cryogenic, ambient or elevated temperatures, at atmospheric, low or high pressures, or applicable combinations thereof. The entire structure is uniformly resistant to the various corrosive atmospheres or the like to which stainless steel is in fact resistant.

An illustrative example of dimensions for a workpiece as shown in FIG. 5 is as follows:

Length of parent part: 10 feet to 60 feet

Wall thickness of parent part and appendages: ¼ inch or thicker:

Outer diameter of parent part and appendages: 1½ inch or larger:

Length of appendages: Usually about 3 inches, which permits fusion and flash-butt welding to be used.

When stainless steel is used throughout, it will be found that the physical properties of the assembled construction are remarkably constant and are unaffected by the assembly processes and by the inclusion of the appendages as suggested herein.

This invention thereby provides a means to give to the assembler in the field and shop a useful workpiece to be assembled, which can be assembled to another complementary workpiece (the term complementary meaning a parent part with a similar appendage) so as to be assembled by welding processes in the field or shop without further heat treating operations and without the adverse effects of sensitization.

This invention is not to be limited by the embodiments shown in the drawings and described in the description which are given by way of example and not of limitation but only in accordance of the scope of the appended claims.

What is claimed is:

1. A method for joining by welding two workpieces, each of which comprises a sensitizable unstabilized wrought austenitic stainless steel parent part which wrought stainless steel material when heated to a sufficiently elevated temperature, such as by welding, to form a weld heat affected zone, precipitates carbides in the grain boundaries of said zone and thereby becomes sensitized in said zone, said method comprising:

a. welding to said wrought structured parent part appendages of cast dendritic structured unstabilized austenitic stainless steel material having a thickness of about ¼ inch or greater, which is substantially equal to or better in corrosion resistance, mechanical properties and metallurgical welding properties than the material of the parent part, and is compatible with solution heat treating of the material of the parent part for the purpose of dissolving carbides from the heat affected zone of the parent part, which cast material heated by welding is not sensitized, thereby to form a said workpiece, said welding operation causing sensitization in the heat affected zone of the parent part, the parent part and the appendages at their abutments having substantially equal wall thicknesses;

b. solution heat-treating the said workpieces to dissolve said carbides and thereby desensitize the parent part; and c. utilizing a complementary workpiece, welding the said workpieces together by their appendages, the temperature, duration of time to make the weld, and the dimensions of the appendages being such that no portion of the parent parts reaches a temperature such as to cause it to be sensitized in this step.

2. A method according to claim 1 in which the parent parts are pipes and the appendages are tubular sections.

3. A method according to claim 1 in which the parent parts and the appendages are plate-like.

4. A method according to claim 1 in which an appendage is welded to a face of the parent part.

5. A method according to claim 1 in which the workpieces form a passageway for fluid mediums.

6. A method according to claim 1 in which the material of the parent parts is wrought type 304 stainless steel.

7. A method according to claim 6 in which the material of the appendages is type 308 stainless steel or its casting alloy equivalent.

8. A method according to claim 1 in which the parent material and the appendage material are selected from the group consisting of types 301, 302, 304, 308, 309, 310, 312, 314, 316, and 317 weldable austenitic stainless steel.

9. A workpiece to be welded to a complementary workpiece to form an assembly without sensitization in the aswelded condition, said workpiece comprising a parent part made from sensitizable unstabilized wrought austenitic stainless steel of the type which when heated to a sufficiently elevated temperature, such as by welding, forms a heat affected zone wherein carbides are precipitated in the grain boundaries of said zone thereby to sensitize the heat affected zone, said workpiece further including an appendage welded to said parent part, said appendage being made of an unstabilized austenitic stainless steel alloy of cast dendritic structure which is substantially equal or better in corrosion resistance, mechanical properties, and metallurgical welding properties of the parent part, and is compatible with solution heat treating of the material of the parent part for the purpose of dissolving carbides from the heat affected zone of the said parent part, said workpiece having been solution heat treated to dissolve said carbides from the heat-affected zone in the parent part, the parent part and the appendage at their abutments having substantially equal wall thicknesses, said wall thicknesses being about ¼ inch or greater.

10. A workpiece according to claim 9 in which the parent part member is a pipe, and in which the appendage is tubular section.

11. A workpiece according to claim 9 in which an appendage is welded to a face of the parent part.

12. A workpiece according to claim 9 in which the material of the parent part is wrought type 304 stainless steel.

13. A workpiece according to claim 12 in which the material of the appendage is type 308 stainless steel.

14. A workpiece according to claim 9 in which the parent material and the appendage material are selected from the group consisting of types 301, 302, 303, 304, 308, 309, 310, 312, 314, 316 and 317 weldable austenitic stainless steel.

15. In combination: two workpieces according to claim 9, said workpieces being welded together at their appendages without sensitization of the material of any parent part.

* * * * *